Figure 1:
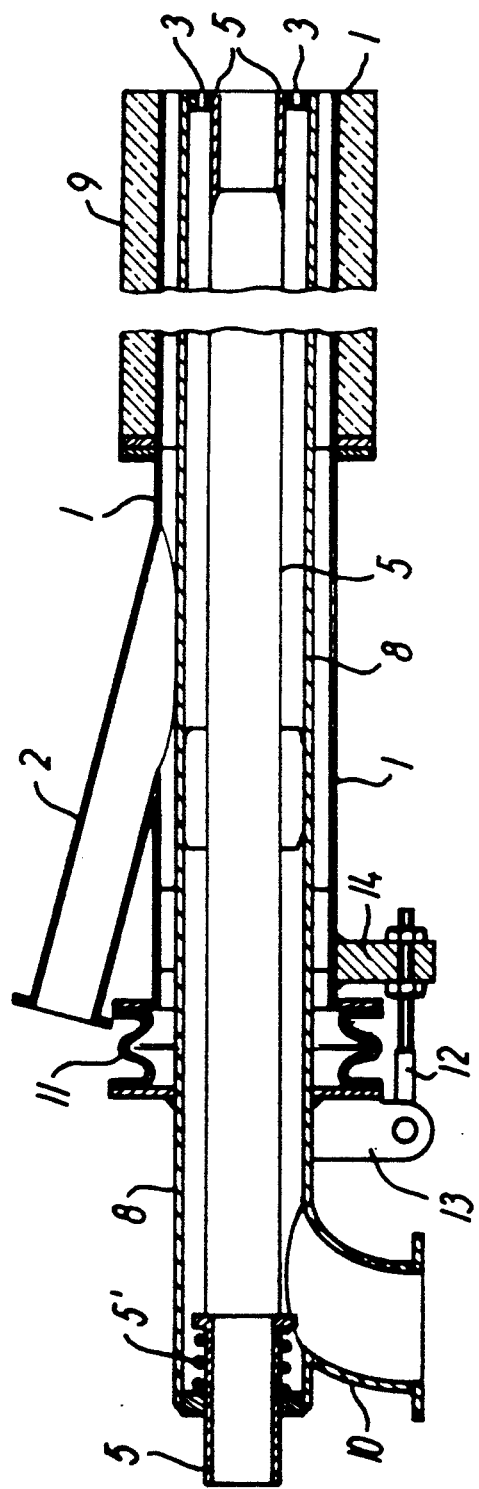

United States Patent [19]

Olsen

[11] Patent Number: 5,299,512
[45] Date of Patent: Apr. 5, 1994

[54] BURNER FOR A ROTARY KILN

[75] Inventor: Ib Olsen, Valby, Denmark

[73] Assignee: F. L. Smidth & Co. A/S, Denmark

[21] Appl. No.: 868,470

[22] Filed: Apr. 14, 1992

[30] Foreign Application Priority Data

Apr. 19, 1991 [DK] Denmark ................. 709/91

[51] Int. Cl.⁵ ........................... F23C 1/10; F23C 1/12
[52] U.S. Cl. .................................. 110/261; 110/263; 110/264; 110/347; 431/284; 431/285
[58] Field of Search ............... 110/264, 260, 261, 262, 110/347; 431/284, 285

[56] References Cited

U.S. PATENT DOCUMENTS

| | | | |
|---|---|---|---|
| 3,100,461 | 8/1963 | Werner | 110/261 X |
| 4,428,727 | 1/1984 | Deussner et al. | 110/261 X |
| 5,129,333 | 7/1992 | Frederick et al. | 431/284 X |

Primary Examiner—Edward G. Favors
Attorney, Agent, or Firm—Brumbaugh, Graves, Donohue & Raymond

[57] ABSTRACT

A burner for a rotary kiln consists of a central pipe (5) for introducing an oil or gas lance, a first concentric pipe (8) for introducing primary air and a second concentric pipe (1) for introducing a mixture of solid fuel and carrier air into the burning zone of the kiln. The pipes (5, 8 and 1) form mutually annular channels, the primary air channel being located inside the solid fuel/air channel and at its end facing the burning zone being provided with nozzles mounted parallel to the axis of the burner, the primary air streams from the nozzles drawing the particles of solid fuel towards the core of the flame in the burning zone to increase the combustion and to reduce the $NO_x$-content in the kiln exhaust gases. The burner is provided with a heat exchanger (14, 18 and 20) surrounding the portion of the burner projecting into the kiln to cool the burner and to increase the primary air velocity during injection into the burning zone.

8 Claims, 3 Drawing Sheets

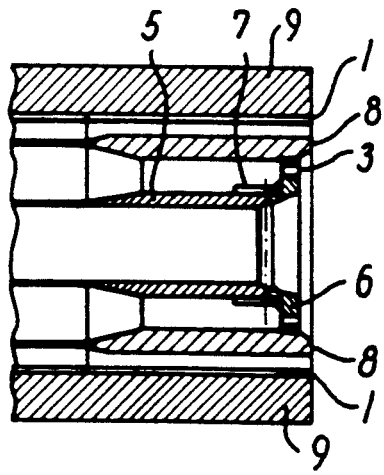
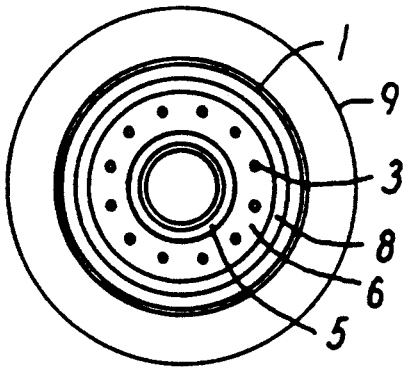
FIG.3A  FIG.3B
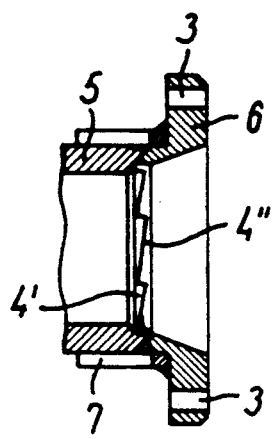
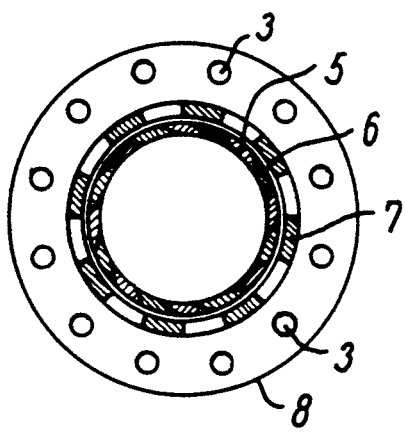
FIG.4A  FIG.4B
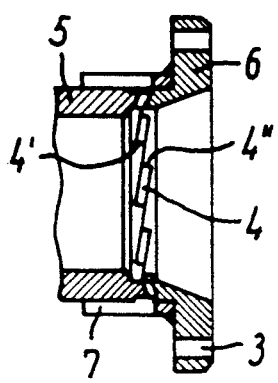
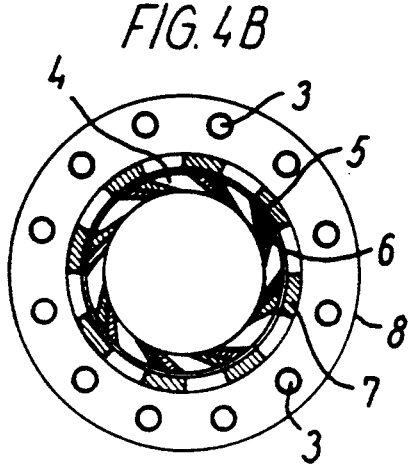
FIG.5A  FIG.5B

BURNER FOR A ROTARY KILN

The present invention relates to a burner for feeding a solid and liquid or gaseous fuel into a burning zone of a kiln, e.g. a rotary kiln, and a method of generating a flame in the said burning zone by means of the burner.

Such burners have been known for a number of years, originally in the form of one-channel burners which were gradually improved to multiple-channel burners which allowed the simultaneous introduction of several types of fuels into a kiln and hence combined the advantages of e.g. solid and liquid or gaseous fuel in order to obtain the best possible flame formation in the burning zone of the kiln by use of the least possible amount of primary air so as to obtain a desired increase in the operational economy of the kiln in question.

An example of a multiple-channel burner is disclosed in the German monthly "Zement-Kalk-Gips", No. 8/1979, page 388, in the form of a two-channel rotary kiln burner, "two-channel" used here in the sense of the two annular channels formed by means of two concentric pipes surrounding the central pipe of the burner through which gaseous or liquid fuel, e.g. in the upstart phase of the burner, is introduced into the burning zone. Primary air is conveyed to the burning zone through the inner annular channel of the burner, whereas coal dust is conveyed through the outer annular channel. At the burning zone end, the primary air channel is provided with helical inserts which cause the air stream to rotate, and the channel terminates in a divergent annular orifice which causes the rotating air stream to be brought into contact with the stream of coal dust injected in axial direction. During operation, the burner thus tends to divert a part of the coal particles away from the flame axis and hence to disperse the flame over the entire kiln cross section.

In the three-channel burners, an annular channel has been added outside the coal channel of a two-channel burner.

A three-channel burner is known from e.g. U.S. Pat. No. 4,373,400 which discloses a third outer annular channel for an amount of primary air injected into the burning zone through the annular orifice of the channel in an axial or divergent direction, whereas coal dust is injected through the central channel which is provided with an annular orifice having a usually axial injection direction, while another amount of primary air is being injected through the inner annular channel and leaves the burner in a whirling and divergent direction. Thus, also in this burner the flame is dispersed over substantially the entire kiln cross section.

DE-C-3027587 disloses another three-channel burner in which the outer annular channel for primary air to the burning zone terminates in a number of nozzles, the axes of which nozzles may diverge of from 0° to 20° to the axis of the burner. The middle channel for feeding coal dust is ordinarily annular and has divergent outlets but it may consist of a channel divided into sections by means of built-in ribs, said channel being concentric with the primary air channel which is provided with nozzles.

Finally, DK-A-232/90 discloses a three-channel burner in which an annular coal channel is surrounded by an annular primary air channel on the inside as well as on the outside, and in which the outer primary air channel facing the burning zone terminates in nozzles parallel to the axis of the burner, the task of the nozzles being to draw secondary air into the burning zone.

Both of the two latter three-channel burners operate like the burners according to the two first mentioned disclosures, viz. they disperse the flame of the burner over the entire kiln cross section and it naturally follows that they operate with a relatively large amount of primary air, e.g. typically 10% of the stoichiometric combustion air and injected at 70–150 m/sec. under a pressure of up to 140 mbar.

In recent years, the ever increasing environmental requirements have strongly focused on reducing the nitrogen oxide content of the flue gas from rotary kiln plants and one of the means of effecting such a reduction is through a reduction of the primary air consumption in the burning zone of the kiln.

It is well known in rotary kiln burner designs that the primary air impulse is a decisive parameter for the flame formation in the burning zone of the kiln, the primary air impulse being the product of the air amount and the air velocity on leaving the burner. A reduction of the amount of primary air without a corresponding increase of the air velocity results in a slow burning of the fuel, a long, sooting flame and an unacceptably high CO-content at the gas outlet of the kiln pipe, even when a high air excess is maintained. Therefore, such a flame will not be able to produce the high temperature required in the treated materials, e.g. in a cement kiln close to its material outlet, but, of course, it will result in a considerable reduction of the $NO_x$-content in the exhaust gases of the kiln.

If the primary air amount is to be reduced to half of the usual amount, the air injection velocity in the burning zone must be doubled, which again requires a quadrupling of the injection pressure. The development of burners tends to go in this direction and on pp. 118–124 of an article in the magazine "World Cement" of April 1990 it is described how a burner according to the above mentioned DE-C-3027587 is caused to operate with 1.6% axial air injected at a velocity of 350 m/sec., with 2.4% swirl air having a velocity of 160 m/sec and with 2.3% carrier air for coal dust injected at a velocity of 28 m/sec. An air velocity of 350 m/sec. requires a pressure of about 1 bar, i.e. very high and cost increasing demands on the injection equipment of the burner.

It is the object of the invention to provide a burner which during operation uses the smallest possible amount of primary air and which generate the smallest possible amount of $NO_x$ and CO and which furthermore operates with the smallest possible amount of excess air. In this manner, the fuel consumption of the kiln and the outlet of polluting $NO_x$, CO and $CO_2$ in the kiln exhaust gas can be reduced. Furthermore, it is the object of the invention to provide a burner which allows the the length of the flame to be reduced in particular during the up-start phase of the kiln or when burning out a ring formation in the treated materials at the kiln material outlet. Finally, it is an object of the invention to provide a method of operating a burner of the type mentioned above.

The object is obtained by means of a burner of the type defined in the preamble of claim 1 and which is characterized by the features defined in the characterizing part of the claim.

Further advantageous, features of the burner according to the invention are defined below.

Furthermore, the object is obtained by means of a method of generating a burner flame as defined below.

The basic principle of the invention is based on the hypothesis that it is advantageous to introduce primary air into the burning zone of the kiln inside the annular stream of coal dust and preferably in an axial direction and to avoid rotation of the primary air stream altogther, unless very special conditions arise, cf. above. Thus, the aim of the primary air is to accelerate the coal particles to a high velocity and simultaneously to avoid dispersing them over the cross section of the kiln. Thus, according to the invention primary air is injected through a number of nozzles placed parallel to the axis of the burner in a ring, said ring closing the annular primary air channel at the end facing the burning zone and in which the nozzles are placed as close as possible to the surrounding tubular coal stream. Separate nozzles providing a high primary air velocity have been found to be more effective in accelerating the coal particles than a primary air stream from an annular channel orifice due to a higher entrainment velocity of the particles.

It is important to try to keep the fuel particles close together in order to create a fuel-rich flame core and thereby to reduce the formation of $NO_x$.

A small distance between the coal particles is also desirable in order to enhance the exchange of radiant heat between the particles, and a high velocity difference between the coal particles and air is required in order to ensure a rapid removal of the combustion products from and supply of oxygen to the surface of the individual fuel particle. A dispersion of the coal particles over the entire kiln cross section by use of a divergent and/or whirling primary air stream to obtain this well known and desirable effect is less appropriate.

The two-channel burner according to the invention is characterized in that it is lighter and simpler than a three-channel burner. However, if the two-channel burner is to be used exclusively with oil or gas as fuel, there is no coal dust or carrier air to effect the required cooling of the burner pipe within the kiln, even if the burner pipe is provided with a ceramic insulation. This disadvantage is remedied by means of a heat exchanger which surrounds the burner pipe inside the kiln and through which the total amount of primary air passes and is preheated prior to being fed into the annular primary air channel of the burner. The preheating of the primary air causes the volume of the latter to increase with a corresponding increase of the air velocity and hence an increase of the primary air impulse which again allows the amount of primary air to be reduced while maintaining the effect of the burner.

Figure 2:
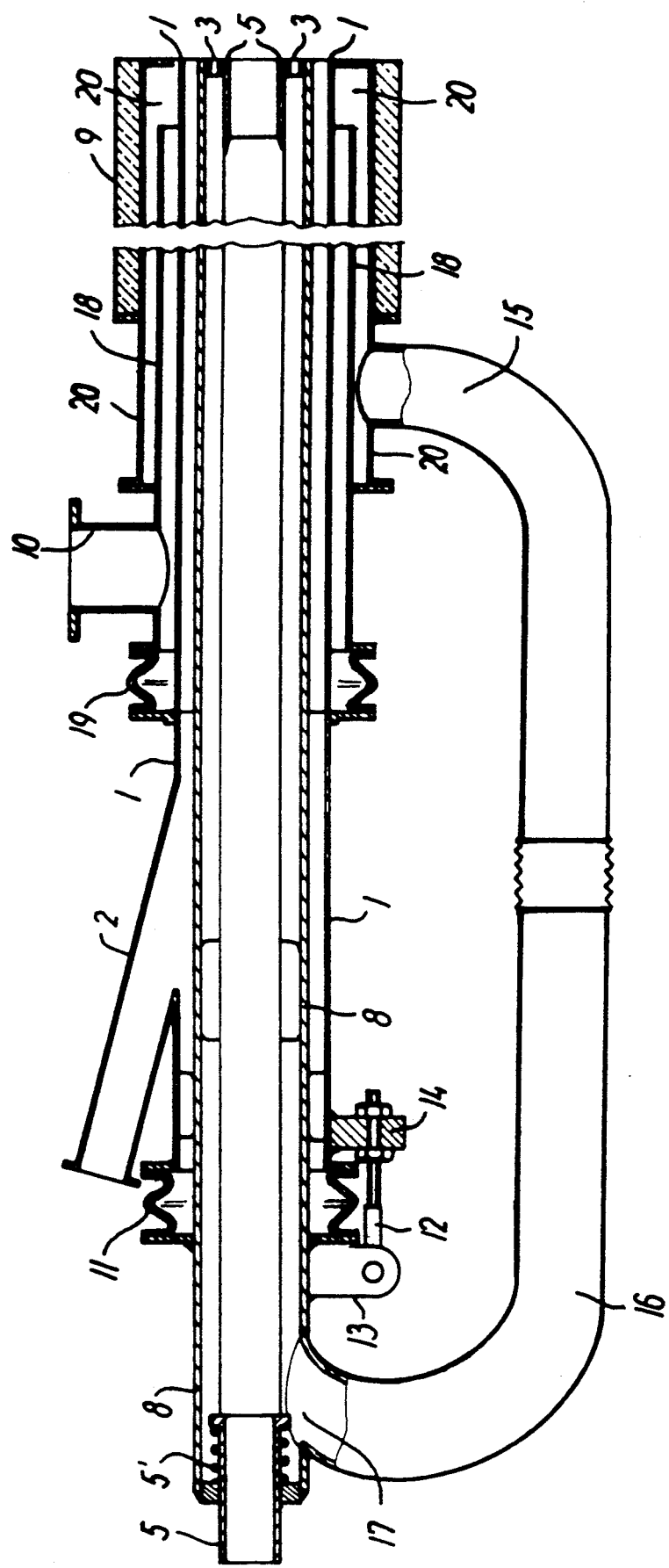

The invention will be explained in further detail below with reference to the drawings which without limiting the scope of the invention illustrate various embodiments of the burner and wherein FIG. 1 shows an axial section through a two-channel burner with no heat exchanger, FIG. 2 shows a corresponding section of a two-channel burner provided with a heat exchanger, FIG. 3A shows a more detailed axial section of the end of the burner facing the burning zone, FIG. 3B shows the corresponding end of the burner seen from above, FIG. 4A and 4B show a sectional view of a detail in FIG. 3A in one position, and FIG. 5A and 5B show the same detail shown in another position.

In all the drawings, the same reference numerals are used for the same parts in a burner.

FIG. 1 shows a burner having a central pipe 5 for alternative feeding of liquid or gaseous fuel through an oil or gas lance into a burning zone of a rotary kiln. The pipe 5 is surrounded by a concentric pipe 8 to form a first annular channel which is fed with primary air through an air inlet 10 and which conveys the air to a number of nozzles 3 arranged parallel to the axis of the burner in a ring which terminates the pipe 8 at the end facing the burning zone. The orifices in the nozzles 3 may be adjustable in a manner known per se. The pipe 8 is surrounded by another con centric pipe 1 to form a second annular channel 11 for pneumatic conveyance of coal dust into the burning zone by means of carrier air. The coal/air stream is supplied to the latter channel through an inlet 2 and is fed into the burning zone at a velocity which is sufficiently high to prevent the coal particles from falling out of the stream during its passage through the burner. In practice, the relation of coal to air is 4–10 kg coal per $m^3$ air, and the maximum velocity of the carrier air is 35 m/sec in order to obtain an expedient balance between the flame formation, the combustion velocity and the wear of the coal particles on the inside surface of the pipe. The coal dust is injected into the burning zone through the annular orifice formed in the coal/air channel at its end facing the burning zone in such a manner that the stream of coal initially forms a "duct" in the burning zone, and from which "duct" the nozzle effect from the internally placed nozzles causes the coal particles to be drawn towards the core of the flame.

The pipe 1 may be displaced axially in relation to the pipe 8 in a manner known per se so as to change the mixing velocity between coal, primary air and secondary air injected directly into the burning zone, thereby adjusting the shape of the flame. In principle, the mechanism for causing this displacement is shown in the form of a annular flexible bellow seal 11 and an adjustment mechanism 12,13,14, and the axial displacement is effected by a turning of nuts on a threaded portion of the rod 12.

Inside the kiln, the burner is on its outer side covered by a ceramic insulation 9 to protect it against the heat.

As mentioned above, conditions may arise which require that the primary air is also fed to the burning zone in a divergent direction. For this purpose, the burner according to the invention is provided with another set of adjustable nozzles between the primary air channel and the burning zone as shown in FIGS. 3–5. At the end facing the burning zone, the pipe 8 is closed by a ring 6 in which the nozzles 3 are mounted. The ring is fixedly mounted on the inside surface of the pipe and the clear opening of the ring forms a conical transition to the pipe 5 which is rotatably mounted in the burner and which in its starting position is caused to bear against the adjacent surface of the ring 6 by means of a spring load (5'). A bush 7 provided with slots is welded to the same surface of the ring 6, the bush surrounding the pipe end 5 which moves inside the bush when turning the pipe. The end of the pipe 5 facing the burning zone is provided with a helical toothing 4' which is complementary to a corresponding helical toothing 4" on the surface of the ring facing away from the burning zone. In the starting position the two toothings completely engage and consequently completely prevent passage of primary air which is thus only allowed to pass through the nozzles of the primary air channel. When turning the pipe 5 towards the pitch of the helical toothing, the teeth 4' slide upwards upon the corresponding inclined surfaces on the corresponding teeth 4" of the closure ring 6 and hence form tangentially directed openings 4 for a part of the primary air in the primary air channel. The size of the openings 4 corresponds to the size of the turning of the pipe 5 along the inclined surface of a teeth. If the turning is continued, the sloping teeth will again completely engage with one another and due to the spring load on the pipe 5 again prevent passage of primary air through this passage.

Due to the shape and size of the slot openings, the primary air introduced into the pipe 5 through the slots 4 will be subjected to a corresponding whirling motion through the burning zone so as to cause a desired change of the flame formation therein. The divergent orifice of the pipe 5 facing the burning zone gives the rotation air a movement component outwards to the circumference of the kiln.

FIG. 2 shows another burner embodiment according to the invention and which is provided with a heat exchanger for cooling the burner end inside the kiln and for preheating the primary air. The heat exchanger consists of a concentric pipe arrangement 20, 18 surrounding the pipe 1 and provided with an inlet 10 for primary air and an outlet 15 for preheated primary air which via a duct 16 is directed to the opposite end of the primary air channel formed by the pipe 8 and the central pipe 5. The heat exchanger is surrounded by a protective jacket of ceramic material 9 and is closed at the end facing the burning zone. At its opposite end, the heat exchanger is closed with a flexible bellow seal 19. The inner pipe 18 of the heat exchanger forms a cylindrical wall which does not fully extend to the end wall of the heat exchanger so as to form within the end wall an annular channel for the passage of primary air from the inner heat exchanger pipe to the outer one. The heat exchanger shown in the figure has only two channels or pipes, but it may just as well consist of a number of additional pipes, depending on which heat exchanger effect is desired.

Comparative tests conducted between a three-channel burner of a known type having a centrifugal blower with a maximum pressure of 125 mbar and a burner according to the invention during burning of 3000 kg/h petroleum coke having a heat value of 7000 kcal/kg and a nitrogen content of 2.32% produced the following results:

|  | Three-channel burner | Burner according to the invention |
| --- | --- | --- |
| $NO_x$ in the exit gas | 1000 ppm at 2% $O_2$ | 650 ppm at 2% $O_2$ |
| CO in exit gas | 1% of $O_2$ | 1% of $O_2$ |
| Primary air | 9% of stoichiometric combustion air | 2-3% of stoichiometric combustion air |
| Injection velocity of primary air | 140 m/sec | 300 m/sec |

I claim:

1. A burner for feeding a solid and a liquid or gaseous fuel into a burning zone of a kiln the burner comprising a central fuel supply pipe (5) for liquid and/or gaseous fuel, a first concentric pipe (8) surrounding the central pipe so as to form between the concentric pipe and the central pipe an annular channel for feeding primary air supplied to the burner through an inlet (10) into the burning zone, and a second concentric pipe (1) surrounding the first concentric pipe so as to form another annular channel between the first and the second concentric pipes for pneumatic feeding of solid fuel into the burning zone supplied to the burner together with a carrier air through an inlet (2), characterized in that the end of the pipe (8) facing the burning zone is closed by a plate-formed ring (6) fixedly mounted on said end of the pipe and provided with a number of nozzles (3), the axes of the nozzles being parallel to the axis of the burner, that the surface of the ring (6) facing the pipe end (5) is provided with a helical toothing (4"), whereas the surface of the ring facing the burning zone forms an divergent opening for the pipe (5), that furthermore a bush (7) provided with slots and which surrounds the pipe (5) is welded to the inner side of the ring (6), that the pipe (5) at its end facing the ring is likewise provided with a helical toothing (4') which is complementary to the toothing (4") on the ring (6), that the pipe (5) is rotatably mounted and due to an axial spring load (5') working in the direction towards the burning zone is caused to bear against the surface of the ring (6) facing away from the burning zone, and that a turning of the pipe (5) causes the toothings to provide slot-formed, tangentially directed openings (4) for passage of primary air from the primary air channel into the central pipe (5).

2. A burner according to claim 1, characterized in that the mutually complemetary helical toothings (4',4") at the end of the pipe (5) and the backwards-facing surface of the ring (6), respectively, are constructed in such a manner that in a starting position the spring load (5') causes the toothing (4') at the end of the pipe (5) to bear against the toothing (4") on the ring (6) so as to mutually engage, which prevents passage of primary air through the toothings forcing all primary air out through the nozzles, and that a turning of the pipe (5) towards the pitch of the helical toothing causes the toothings to form tangential slots (4) to allow passage of a part of the primary air in the pipe (8) into the pipe (5) so as to give the primary air fed into the burning zone through the slots (4) a rotating motion and due to the divergent orifice of the pipe (5) also giving it a motion in the direction towards the circumference of the kiln in the burning zone.

3. A burner according to any one of claims 1 or 2, characterized in that at its end facing the burning zone, the outer concentric pipe (1) of the channel for solid fuel is surrounded by yet another concentric pipe (20) forming an annular space closed at both ends, said space acting as a heat exchanger between heat generated in the burning zone and colder primary air fed to the burner.

4. A burner according to claim 3, characterized in that the heat exchanger space is divided into at least two concentric channels by at least one cylindrical partition, the channel closest to the axis of the burner being connected to the primary air inlet (10), while the channel surrounding the aforesaid channel is connected to the latter through the annular channel (20) thus formed and has an outlet (15) for preheated primary air, which outlet via a duct (16) is connected to an inlet (17) in the primary air channel at the end of channel facing away from the burning zone.

5. A method of generating a flame in the burning zone of a kiln by means of the burner according to any one of claims 1 or 2, characterized by the steps of pneumatically feeding the particles of solid fuel to the burning zone through the annular channel formed by the pipe (1) at a velocity sufficient to prevent the particles from falling out of the stream of carrier air inside the channel, accelerating the particles in the burning zone by feeding primary air into the burning zone through the annular channel formed in the pipe (8) and by means of the nozzles (3) at a higher velocity than the velocity of the particles, thereby drawing the particles of solid fuel towards the core of the flame to increase its fuel content and to improve combustion in the burning zone and hence to decrease the $NO_x$-content of the kiln exhaust gases.

6. A method according to claim 5 including the step of displacing the pipe (1) axially in relation to the pipe (8) to adjust the flame generated in the burning zone, such that the displacement of the pipe (1) exclusively adjusts the mixing velocity in the burning zone of solid fuel, primary air and secondary air injected directly into said zone.

7. A method of generating a flame in the burning zone of a kiln by means of the burner according to claim 3, characterized by the steps of pneumatically feeding the particles of solid fuel to the burning zone through the annular channel formed by the pipe (1) at a velocity sufficient to prevent the particles from falling out of the stream of carrier air inside the channel, accelerating the particles in the burning zone by feeding primary air into the burning zone through the annular channel formed in the pipe (8) and by means of the nozzles (3) at a higher velocity than the velocity of the particles, thereby drawing the particles of solid fuel towards the core of the flame to increase its fuel content and to improve combustion in the burning zone and hence to decrease the $NO_x$-content of the kiln exhaust gases.

8. A method according to claim 7 including the step of displacing the pipe (1) axially in relation to the pipe (8) to adjust the flame generated in the burning zone, such that the displacement of the pipe (1) exclusively adjusts the mixing velocity in the burning zone of solid fuel, primary air and secondary air injected directly into said zone.

* * * * *